(12) United States Patent
Götz et al.

(10) Patent No.: US 7,255,211 B2
(45) Date of Patent: Aug. 14, 2007

(54) DASHPOT WITH AMPLITUDE-DEPENDENT SHOCK ABSORPTION

(75) Inventors: Ole Götz, Hamberg (DE); Andreas Nevoigt, Hagen (DE); Walter Burböck, Stuttgard (DE); Dirk Feist, Herne (DE); Claus Weimann, Wetter (DE); Ralf Wilhelm, Oberreichenbach (DE); Ulrich Hartig, Mandern (DE); Elmar Lauer, Weiskirchen (DE); Markus Schmidt, Trier (DE); Andreas Kaup, Nonnweiler (DE); Tina Eisenring, Mandern (DE); Joachim Körner, Mandern (DE); Alfons Schreiner, Gusenberg (DE); Thomas Jost, Schillingen (DE)

(73) Assignee: Thyssenkrupp Bilstein Suspension GmbH (DE)

( * ) Notice: Subject to any disclaimer, the term of this patent is extended or adjusted under 35 U.S.C. 154(b) by 0 days.

(21) Appl. No.: 10/885,446

(22) Filed: Jul. 6, 2004

(65) Prior Publication Data
US 2005/0011712 A1 Jan. 20, 2005

(30) Foreign Application Priority Data
Jul. 8, 2003 (DE) ................................. 103 30 937
Nov. 4, 2003 (DE) ................................. 103 51 353

(51) Int. Cl.
F16F 9/34 (2006.01)

(52) U.S. Cl. ................................. 188/322.22; 188/280

(58) Field of Classification Search ................ 188/280, 188/322.22, 322.15
See application file for complete search history.

(56) References Cited

U.S. PATENT DOCUMENTS

| | | | | |
|---|---|---|---|---|
| 3,232,390 A * | 2/1966 | Chano | ......................... | 188/280 |
| 3,896,908 A * | 7/1975 | Petrak | ......................... | 188/280 |
| 4,765,446 A * | 8/1988 | Murata et al. | .......... | 188/282.4 |
| 5,248,014 A * | 9/1993 | Ashiba | ..................... | 188/282.8 |
| 5,386,892 A * | 2/1995 | Ashiba | ..................... | 188/282.8 |
| 5,566,796 A * | 10/1996 | De Kock | ................. | 188/282.1 |
| 5,740,890 A * | 4/1998 | Forster | ..................... | 188/322.2 |
| 6,131,709 A * | 10/2000 | Jolly et al. | ............... | 188/267.2 |
| 6,220,409 B1 * | 4/2001 | Deferme | ................ | 188/322.15 |
| 6,241,060 B1 * | 6/2001 | Gonzalez et al. | ........ | 188/319.2 |
| 6,527,093 B2 * | 3/2003 | Oliver et al. | ............ | 188/322.2 |
| 6,561,326 B2 * | 5/2003 | Gotz | ..................... | 188/322.15 |
| 6,651,787 B2 * | 11/2003 | Grundei | ...................... | 188/280 |
| 6,918,473 B2 * | 7/2005 | Deferme | ................ | 188/322.15 |
| 2003/0051957 A1 * | 3/2003 | Lemieux | ................ | 188/322.15 |

* cited by examiner

*Primary Examiner*—Robert A. Siconolfi
(74) *Attorney, Agent, or Firm*—McGlew and Tuttle P.C.

(57) ABSTRACT

A dashpot featuring amplitude-dependent shock absorption, especially intended for the wheel of a vehicle and including a hydraulically parallel cylindrical pressure-compensation chamber (8). The pressure-compensation chamber is partitioned by an axially displaceable floating piston (10). At least one face (25) of the floating piston is provided with a resilient bumper (18).

The object is a dashpot with a floating piston that arrives more gently at its limit inside the pressure-compensation chamber (8).

The bumper is accordingly accommodated in an axial hollow (17) that extends through the body (15) of the floating piston.

21 Claims, 7 Drawing Sheets

_US 7,255,211 B2_

DASHPOT WITH AMPLITUDE-DEPENDENT SHOCK ABSORPTION

BACKGROUND OF THE INVENTION

The present invention concerns a dashpot, or shock absorber, featuring amplitude-dependent shock absorption and including a hydraulically parallel cylindrical pressure-compensation.

Dashpots with amplitude-dependent shock absorption have been developed for use with motor vehicle wheels in particular, to ensure that the level of shock absorption will decrease when the oscillations are both high in frequency and narrow in amplitude. A dashpot of this genus is known from EP 1 152 155 A1. The device features a hydraulically parallel cylindrical pressure-compensation chamber partitioned into two halves by an axially displaceable floating piston. At least one face of the floating piston is provided with a resilient bumper. The bumper is in the form of an O ring that fits into a groove. This is a drawback in that the bumper's performance curve is so hard that the floating piston's impact against the bottom of the pressure-compensation chamber will lead to jolts that are at least heard and in the worst case even felt inside the vehicle. The sudden impacts on the bumper also soon lead to wear. Furthermore, a hard bumper accelerates the transition between soft and hard dashpot-performance curves. This situation in turn can result in impermissibly steep acceleration of the piston rod at the transition point, perceived inside the vehicle as irritating noise or dissonant shock absorption.

SUMMARY OF THE INVENTION

The object of the present invention is a dashpot of the aforesaid genus improved to ensure that the floating piston will arrive gently at its terminal position in the pressure-compensation chamber.

According to the present invention, the elastomeric bumper is accordingly accommodated in a hollow that extends axially through the body of the floating piston. This approach has several advantages. Any deformation will be distributed more uniformly over a wider area of the bumper, and hence there will be fewer local strains in the material. The performance curve can be softer. Another advantage is more reliable cementing or vulcanization to the floating piston's body. There will be less noise and less wear, considerably extending the component's life. In special applications, when the hollow through the body of the floating piston is very wide, the bumper can even be in one piece, with heads on each side that extend over each face. The bumper will accordingly be locked into position in the body of the floating piston in addition to any other means of fastening it.

One embodiment of the present invention features an alternative approach to shock absorption at one end of the floating piston. Here, the floating piston is provided with a central arbor that eventually enters the central hydraulic-fluid supply bore. The result is hydraulic shock absorption without the floating piston impacting the associated base of the pressure-compensation chamber. This embodiment as well ensures a soft start. The inward tapering of the arbor at one end allows adaptation of the shock absorption to individual requirements.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
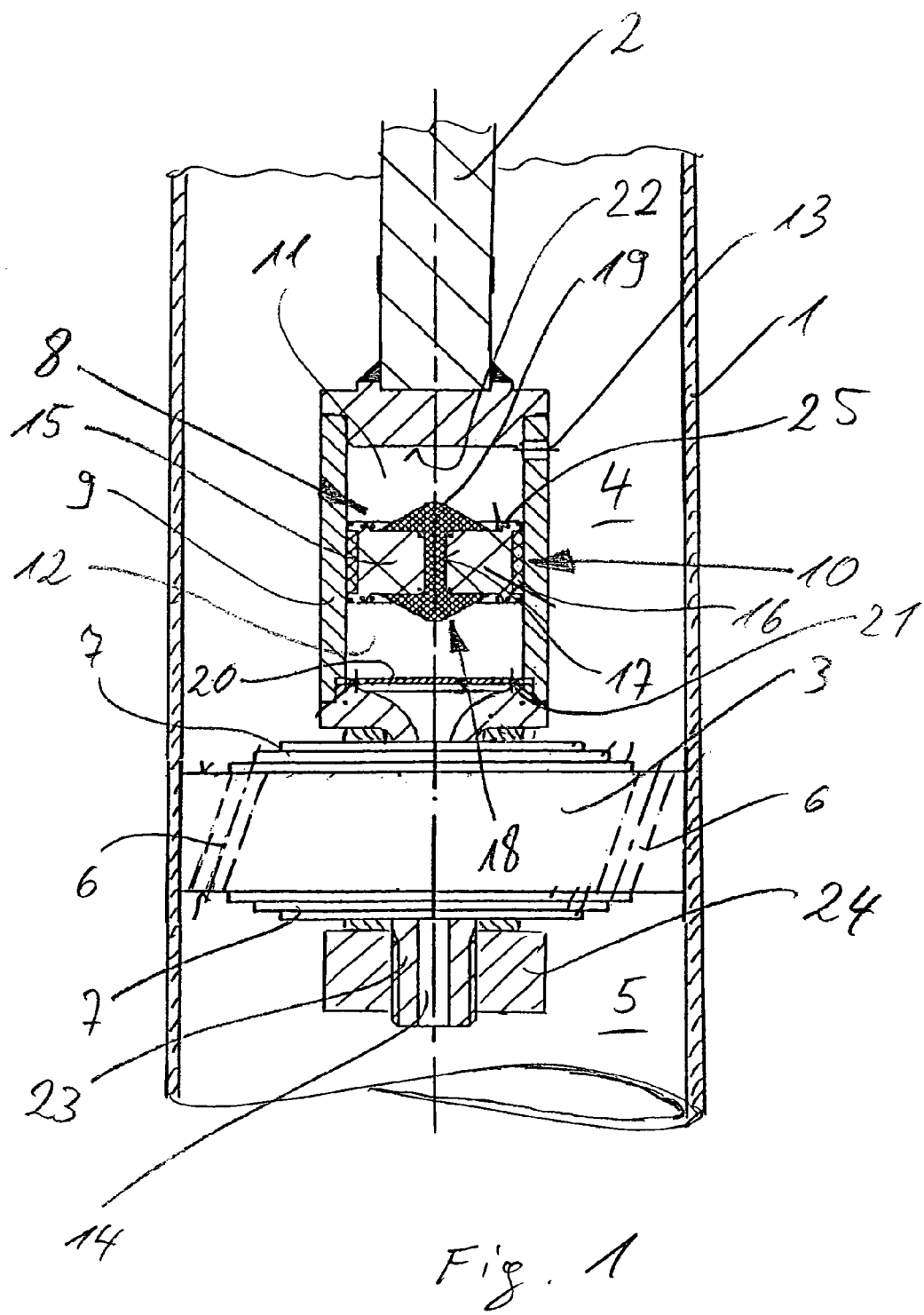
FIG. 1 is a section through the vicinity of the working piston in a dashpot.

FIG. 1 is a section through the vicinity of the working piston in a dashpot with, in the present case, a solid-walled cylinder. Cylinder 1 is closed at the top and bottom and charged with shock absorption fluid. Working piston 3 travels up and down inside cylinder 1 on one end of a piston rod 2. The working piston 3 in the illustrated example is indirectly connected, and partitions cylinder 1 into two compression-decompression compartments 4 and 5. Piston rod 2 travels into and out of cylinder 1 through a sealed port at the bottom. The fluid can flow out of one compression-decompression compartment and into the other through sloping bores 6. The ends of sloping bores 6 are capped top and bottom by resilient stacks 7 of cupsprings, each stack 7 accordingly decelerating the flow.

Cylinder 1 and piston rod 2 are attached by unillustrated means to the vehicle's wheel at one end and to its chassis at the other.

When vibrations of narrow amplitude occur between piston rod 2 and cylinder 1, only weak shock-absorption forces are needed to unnecessarily prevent deterioration of riding comfort, whereas the performance curve of the particular cupspring-capped valves employed will not allow corresponding compensation without simultaneously decreasing the shock-absorption force in the range of higher starting amplitudes, which would have a deleterious effect on driving dynamics. A cylindrical pressure-compensation chamber 8 is accordingly accommodated inside floating piston 10 in an extension 9 of piston rod 2 hydraulically parallel with working piston 3. Pressure-compensation chamber 8 is partitioned into two half chambers 11 and 12 by a floating piston 10. Half chambers 11 and 12 communicate hydraulically through ports, preferably bores 13 and 14, with compression-decompression compartments 4 and 5.

The body 15 of floating piston 10 rests radially by way of a low friction sleeve 16 against the cylindrical inner surface of pressure-compensation chamber 8, allowing the piston to travel up and down axially inside the chamber.

Floating piston 10 is provided with an axial hollow 17, in the form of a central bore in the present example. A bumper 18 in the form of a shaft with a head 19, at each end in the illustrated embodiment, extends through hollow 17, Each head 19 is in the form of a shallow cone, its base covering the adjacent face of body 15. The shaft and heads in the embodiment illustrated in FIG. 1 are in one piece and are vulcanized or molded onto the faces of floating piston 10.

The bore 14 between the lower half chamber 12 of pressure compensation chamber 8 and the lower compression-decompression compartment 5 of cylinder 1 extends along the central axis of piston-rod extension 9. As floating piston 10 comes into action accordingly, and strikes the base represented at the bottom of FIG. 1, bore 14 would ordinarily close too suddenly, inducing impacts in the overall system. This behavior is not desirable, and the bumper would be rapidly destroyed by the edge of the bore. The pressure-compensation end of the bore 14 is accordingly capped with an isolating disk 20. The fluid can flow out of bore 14 and into the lower half chamber 12 of pressure-compensation chamber 8 by way of several ports 21 along the edge of isolating disk 20. In the embodiment illustrated in FIG. 1 as well, accordingly, floating piston 10 will be ensured of a soft start against the base, i.e. isolating disk 20 in the present case, of pressure compensation chamber 8. This function is ensured at any event in relation to the upper base 22 by a radially outward bore 13. Isolating disk 20 will in one alternative not be necessary if the bore 14 through a bolt 23 that working piston 3 is mounted on is a blind bore and does not extend through the lower base. In this event, the bore will communicate with the lower half chamber 12 of floating piston 10 through several supplementary channels. Since the openings into these channels are positioned radially outward in the lower base, bumper 18 will not be able to block them and will not be damaged by the edge of the openings.

The piston-rod extension 9 that accommodates the pressure compensation chamber 8 in FIG. 1 is welded. Its lower end is provided with a bolt 23 whereon working piston 3 is mounted, secured by a nut 24.

Figure 2:
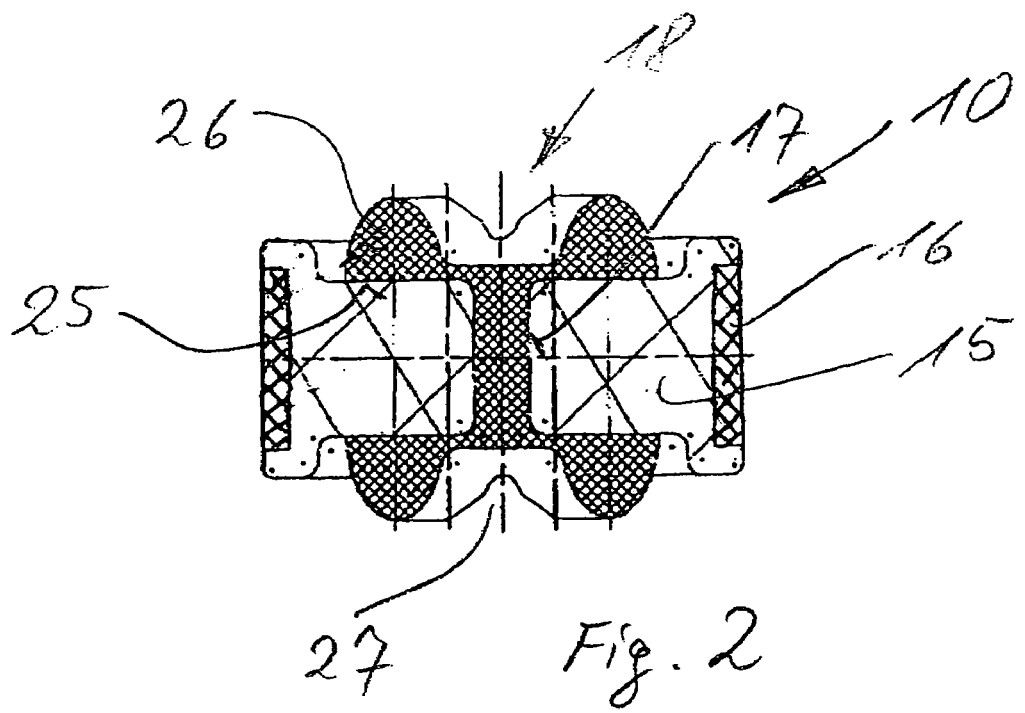
FIGS. 2 and 3 depict different versions of the floating piston.

FIG. 2 illustrates an alternative version of floating piston 10. The floating piston's body 15, low-friction sleeve 16, and axial hollow 17 are similar to the ones illustrated in FIG. 1. Bumper 18 on the other hand is provided with integral annular ridges 26 that rest against the faces of floating-piston body 15. To prevent them from adhering to base 22, each annular ridge 26 is provided with at least one radial intersection 27. The shaft of bumper 18 does not completely occupy hollow 17, simplifying installation in a housing with a central intake channel. Each head of bumper 18 will be thoroughly embedded in a recess provided in each face of floating piston 10. Floating-piston body 15 will impact the base of the cylinder by way of annular ridges 26, limiting the deformation of bumper 18 and accordingly prolonging its life.

Figure 3:
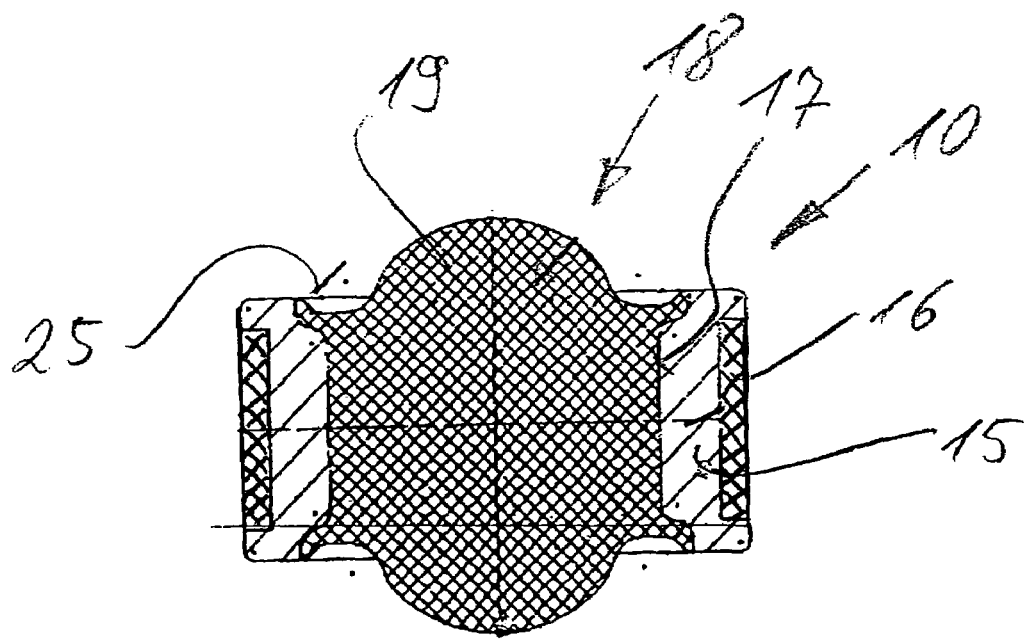

The floating piston 10 illustrated in FIG. 3 is similar to the one illustrated in FIG. 1. In this embodiment, however, hollow 17 is very wide, and the head is provided with a spherical bulge 19. This species of floating piston allows bumper 18 to be separate from floating-piston body 15, and the two components can snap together, resulting in an interlocking attachment. Floating piston 10 will accordingly be easier to adapt to various requirements. Various embodiments of bumper 18 can be combined with various embodiments of floating-piston body 15 as desired. Floating piston 10 can be cemented or vulcanized or fabricated by bicomponent plastic injection molding. The outer annular surface in this embodiment of floating piston 10 can also act as a terminating stop, limiting the extent of deformation of bumper 18. In this event, however, the mass of the bumper will not, as in the embodiment illustrated in FIG. 2, be forced into the depressions in the faces of floating-piston body 15 but will mainly be deformed axially by the body as a whole.

Figure 4:
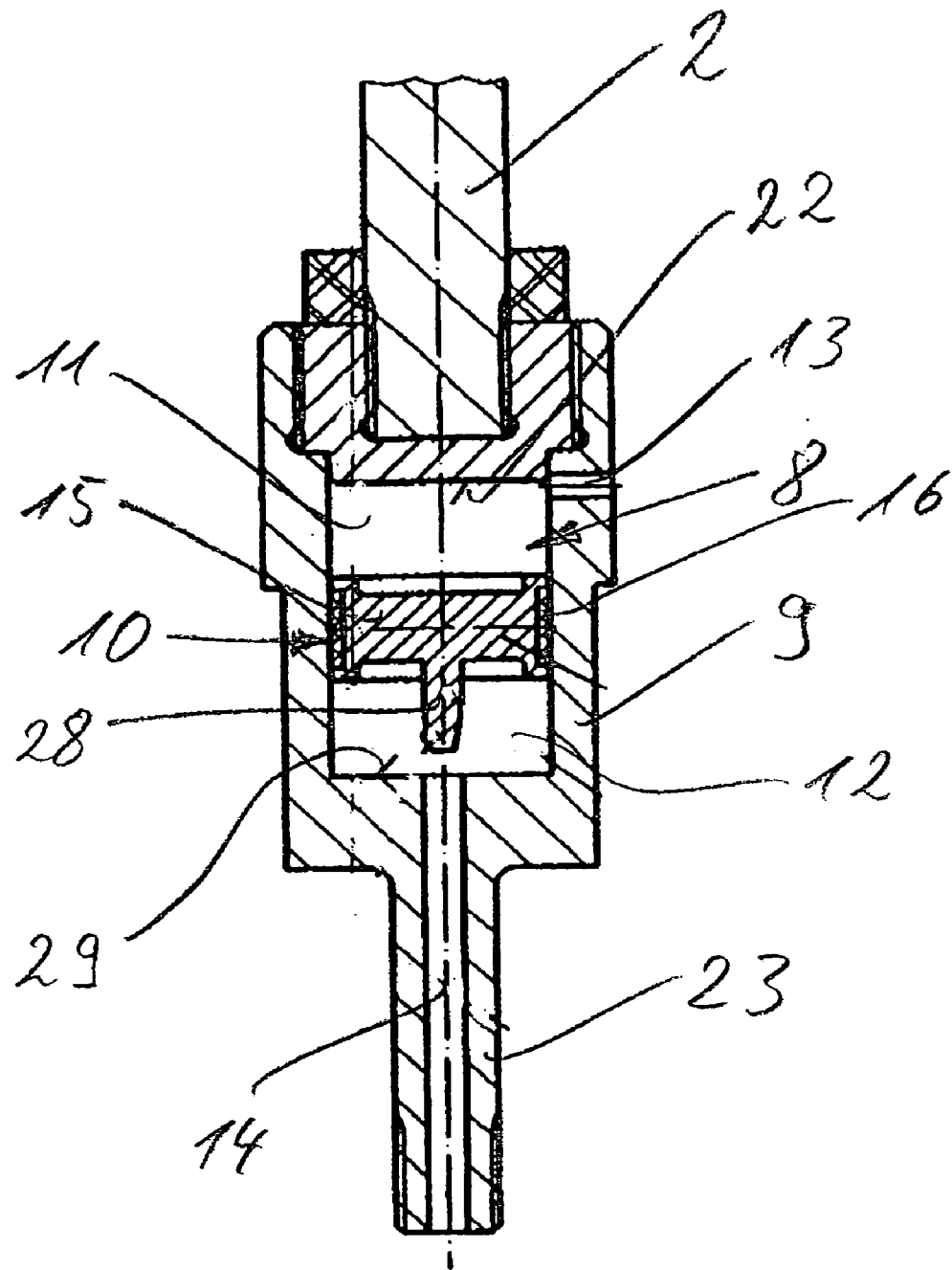
FIG. 4 depicts an alternative version of the floating piston, which operates in conjunction with an associated pressure compensation chamber.

The piston-rod extension 9 depicted in FIG. 4 differs from the one depicted in FIG. 1 in that it is not welded but screwed together. The essential difference, however, is in the terminating shock absorption. Instead of the mechanical shock absorption represented in FIGS. 1 through 3, that is, at least one end features hydraulic shock absorption. One face of floating piston 10 is provided with a central arbor 28 that, as the piston approaches lower base 29, enters the bore 14 through the center of the bolt 23 that working piston 3 is mounted on. The hydraulic flow through the bore will accordingly be impeded. Arbor 28 can, as illustrated in FIG. 4, taper in toward its end. In this event, bore 14 will accordingly gradually close as floating piston 10 comes to rest against lower base 29.

Figure 5:
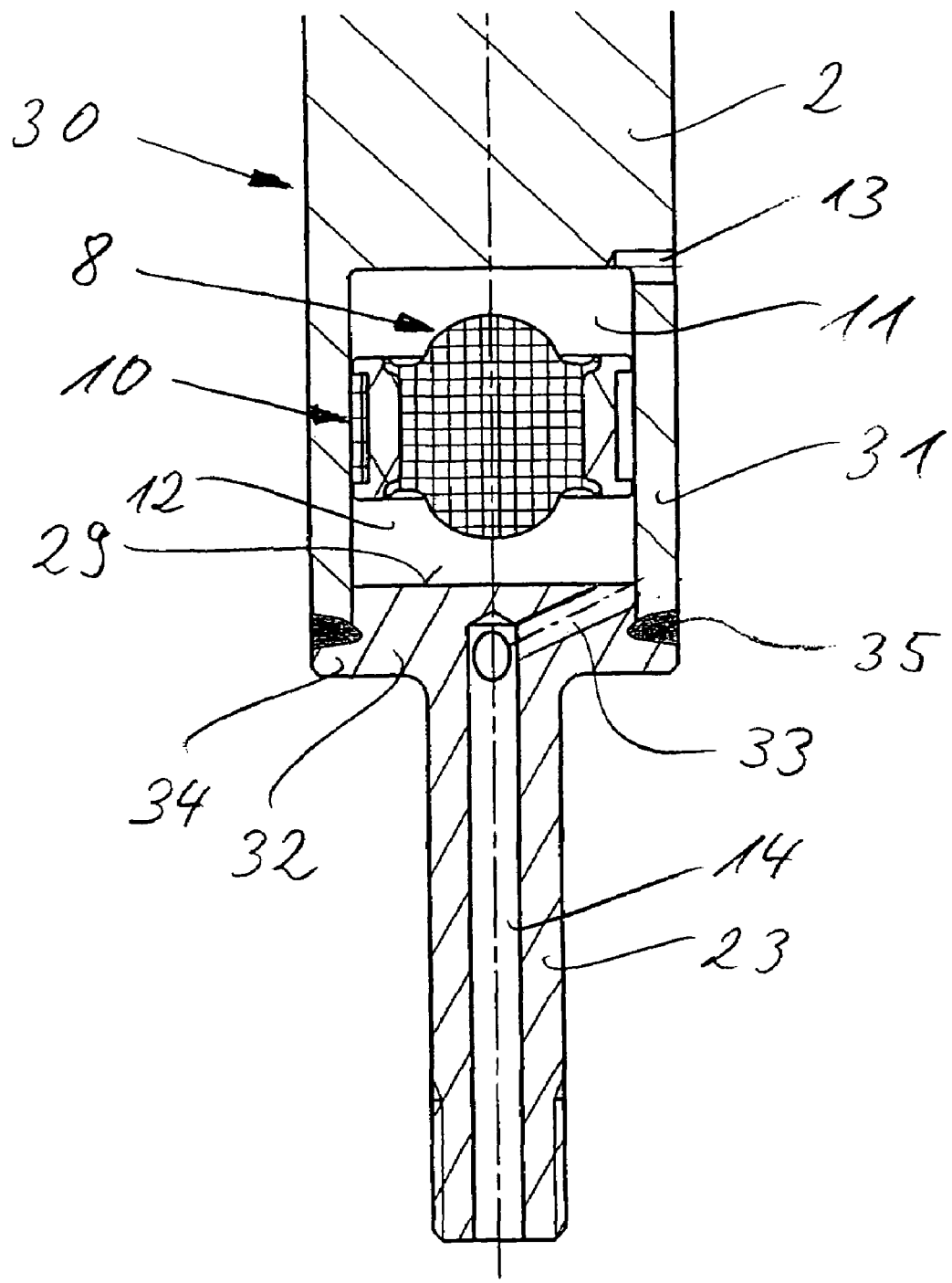
FIGS. 5 and 6 are sections similar to the section in FIG. 1 with alternative versions of the pressure-compensation chamber housing.

The hollow for the pressure-compensation chamber 8 illustrated in FIG. 5 is particularly economical to produce. The hollow itself is in the form of a blind bore in the end of piston rod 2. The bore can be conventionally produced by machining. Cold forging can also be employed.

It is important for the wall 31 at the end 30 of piston rod 2 to be in one piece with the piston rod.

Hydraulic communication between the upper half chamber 11 of pressure-compensation chamber 8 and the upper compression decompression compartment 4 of cylinder 1 is provided, as in the aforesaid embodiments, by a transverse bore 13.

The bolt 23 that the working piston 3 is mounted on in a further development of this embodiment can be cold forged for example and, as illustrated in FIG. 5, provided with a connector flange 32. In this event, the central bore 14 in bolt 23 is blind and does not extend through connector flange 32. Transverse bores 33 slope through the flange and open into the blind end of central bore 14 on the one hand and, on the other, into the edge of the lower base 29 of pressure-compensation chamber 8.

The floating piston 10 in the embodiment illustrated in FIG. 5 is similar to the one illustrated in FIG. 3.

How the piston rod and its extension illustrated in FIG. 5 are assembled will now be specified. Floating piston 10 is inserted into the blind bore that constitutes pressure-compensation chamber 8. Connector flange 32, which is rimmed by a wider lip 34, is inserted into the end of pressure-compensation chamber 8. The wall 31 that demarcates pressure-compensation chamber 8 at the bottom of end 30 is at this stage already being forced powerfully against the circumference of connector flange 32, and the resulting joint between the wall and the flange will be tight of itself. This joint, however, is further reinforced by a weld 35, especially a laser or electron-beam weld.

The tightness of the joint before welding will go far to prevent the inclusion of air during that procedure. As will be evident from FIG. 5, weld 35 is deeper than wall 31 is thick, enuring that the base of the joint will also melt.

The overflow from weld 35 is subjected to lower welding power, preventing the pokeholes that would cause weakness, especially subject to bending stress.

To improve the roundness tolerance between the two components, the joint is welded in at least two passes, with less power during the first. This approach minimizes heat default. Generally the welding speed will be high to keep as much heat as possible out of the work and accordingly to prevent damage to the floating piston.

Figure 6:
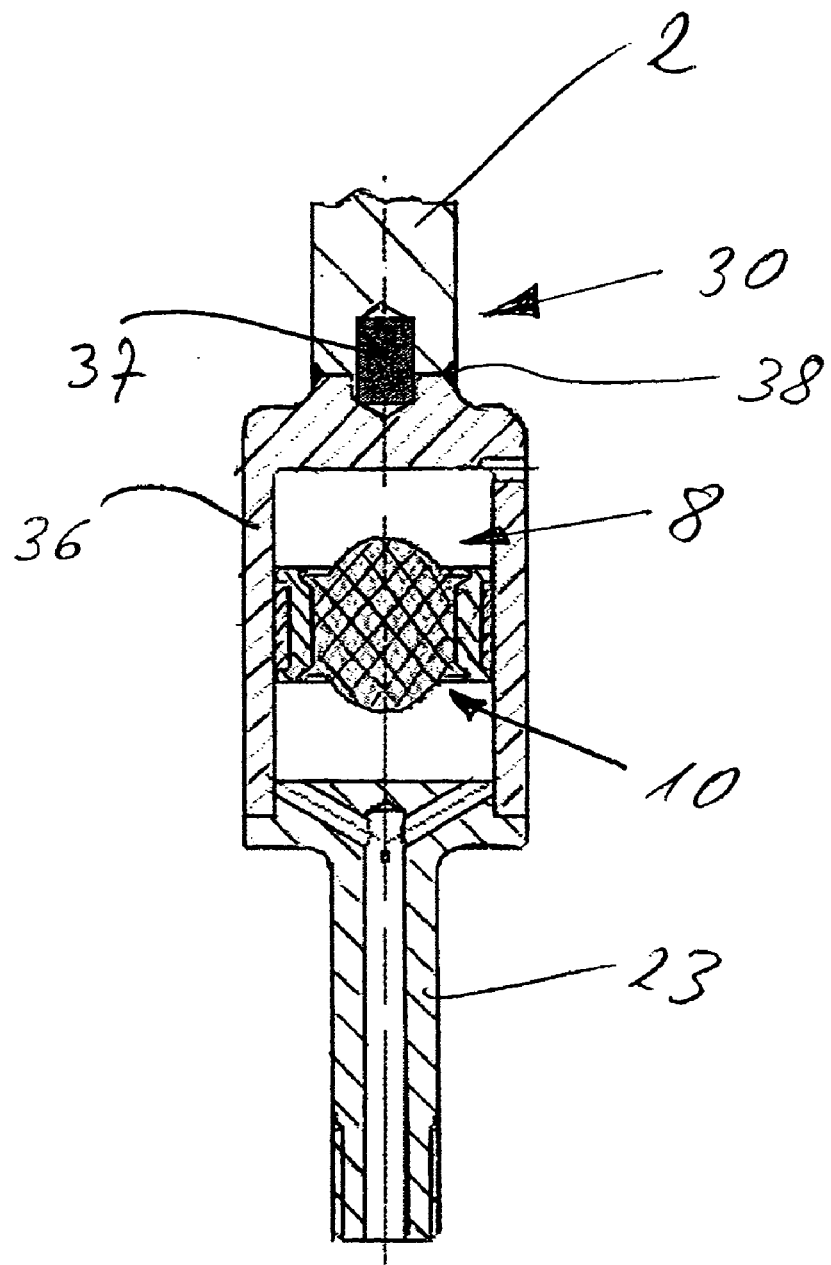

The embodiment illustrated in FIG. 6 is similar to the one illustrated in FIG. 1. The end 30 of piston rod 2 and the adjacent housing 36 for pressure-compensation chamber 8 are aligned by a centering pin 37 before being finally fastened in place by a weld 38. This measure maintains the two components concentric.

Figure 7:
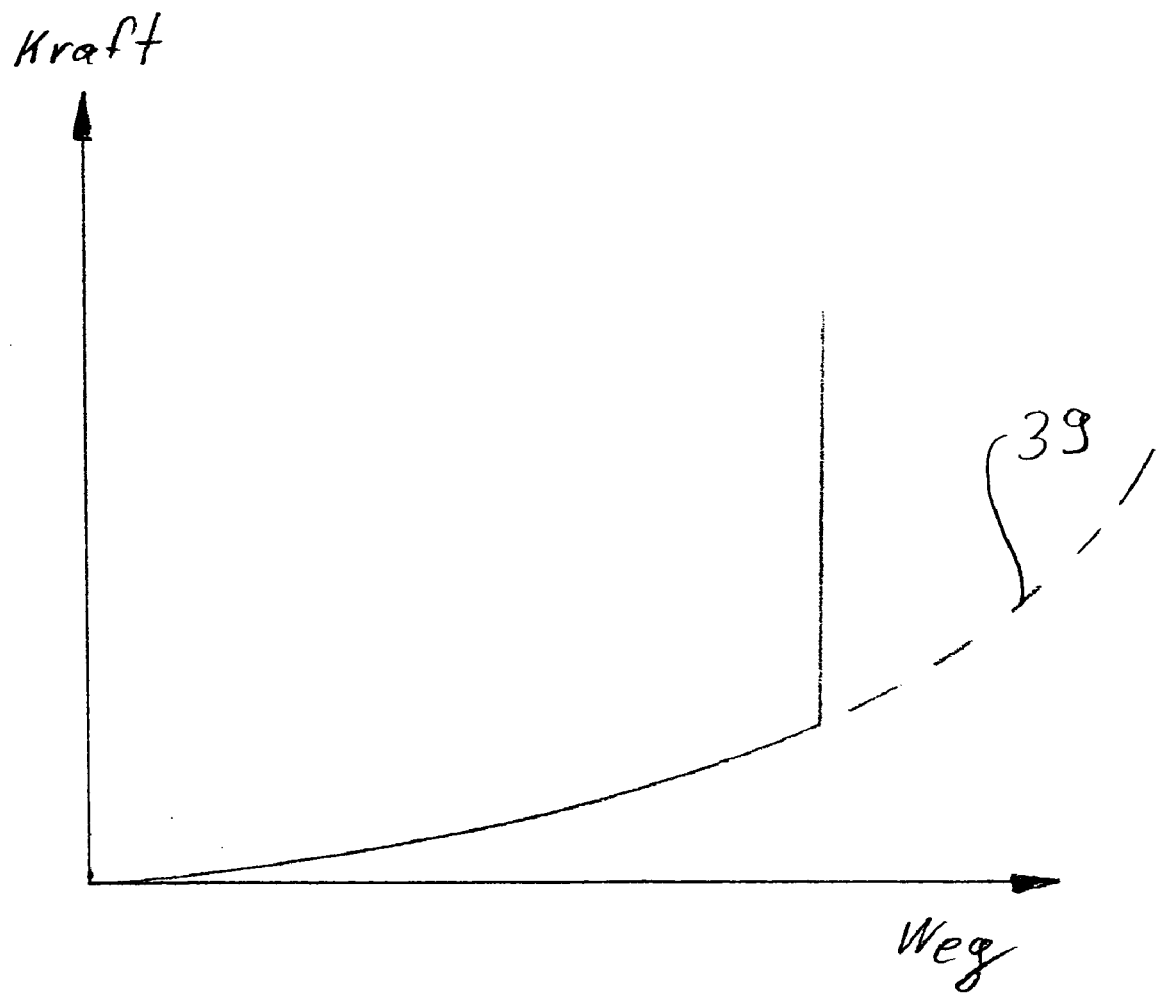
FIG. 7 is a graph representing force over distance as the floating piston enters operation.

FIG. 7 is a graph representing force over distance in a floating piston 10 like the one illustrated in FIG. 3. The piston's gentler approach to upper base 22 or lower base 29 is obvious. Before, however, the bumper can deform enough to generate a steep progressive increase 39 in force, one face 25 of floating piston 10 will have come to rest against its adjacent base 22 or 29. The force-to-distance behavior of bumper 18 will accordingly be very sensitive to tolerances.

Figure 8:
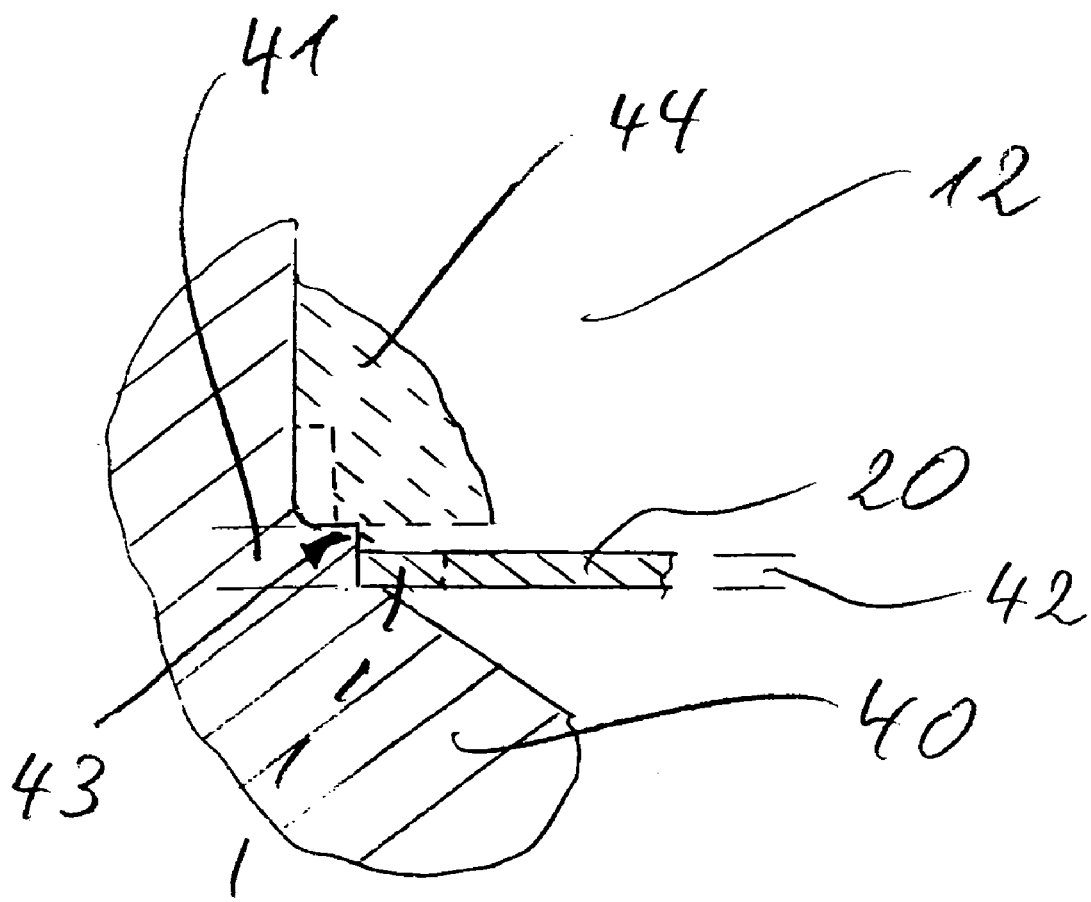
FIG. 8 is a larger-scale illustration of a detail of FIG. 1.

FIG. 8 is a larger-scale rendering illustrating how an isolating disk 20 can be secured in a piston-rod extension and to the bottom 40 adjacent to working-piston accommodating bolt 23 and capping lower half chamber 12.

The bottom 40 in this embodiment is provided with a recess with more or less the same diameter as isolating disk 20. The recess also has a depth 41 that exceeds the thickness 42 of isolating disk 20.

Isolating disk 20 is embedded in the recess and the projecting edge 43 crimped onto it with an overhead punch 44, reliably securing the disk to the bottom 40 of piston-rod extension 9. The disk does not need to be secured as effectively axially because the difference in pressure between lower half chamber 12 and central bore 14 is not very great.

As will be evident from FIG. 8, punch 44 travels laterally along the inner surface of pressure-compensation chamber 8.

Isolating disk 20 can be continuously or discontinuously crimped along its circumference.

List of Parts 1. cylinder
2. piston rod
3. working piston
4. upper compression-decompression compartment
5. lower compression-decompression compartment
6. sloping bore
7. stack of cupsprings
8. pressure-compensation chamber
9. piston-rod extension
10. floating piston
11. upper half chamber
12. lower half chamber
13. transverse bore
14. central bore
15. body of floating piston
16. low-friction sleeve
17. hollow
18. bumper
19. bulge
20. isolating disk
21. port
22. upper base
23. working-piston accommodating bolt
24. nut
25. face
26. annular ridge
27. intersection
28. arbor
29. lower base
30. end
31. wall
32. connector flange
33. transverse bores
34. lip
35. weld
36. housing
37. centering pin
38. weld
39. increase
40. bottom of piston-rod extension
41. depth
42. thickness
43. projecting edge
44. punch

The invention claimed is:

1. A dashpot with amplitude-dependent shock absorption for a wheel of a vehicle, comprising: a working piston; a cylindrical pressure compensation chamber hydraulically parallel with said working piston; an axially displaceable floating piston partitioning said pressure compensation chamber; an axial central bore extending through said floating piston; a single resilient bumper for a face of said floating piston and in said axial central bore; said bumper being vulcanized into said bore; said bumper being a central spherical bulge covering said face of said floating piston; said floating piston having a body with a stationary stop comprising a ring extending beyond said face; said floating piston having a body with an outer surface coated by a material having substantially good friction resistant properties; compression and decompression compartments, said pressure compensation chambers communicating hydraulically at at least one end with one of said compression and decompression compartments through an auxiliary central bore having a blinded end adjacent to said pressure compensation chamber and communicating with said chamber through a further bore sloping in relation to a bottom edge of said chamber; a piston rod connected to said piston; a separate housing at an end of said piston rod, said pressure compensation chamber being in said separate housing; said housing having a bore, and an end of a bolt extending out of said piston rod being in said bore in said housing; said bore in said housing being sufficiently narrow to provide a tight fit between said bore in said housing and said bolt.

2. A dashpot with amplitude-dependent shock absorption for a wheel of a vehicle, comprising: a working piston; a cylindrical pressure compensation chamber hydraulically parallel with said working piston; an axially displaceable floating piston partitioning said pressure compensation chamber; an axial central bore extending through said floating piston; a single resilient bumper for a face of said floating piston and in said axial central bore, said bumper being a central spherical bulge covering said face of said floating piston.

3. The dashpot as defined in claim 2, wherein said bumper is vulcanized into said bore or to said face of said floating piston.

4. The dashpot, as defined in claim 2, wherein said bumper is cemented into said bore or to said face of said floating piston.

5. The dashpot as defined in claim 2, wherein said floating piston has a body, said bumper and said body being bicomponent injection molded from rubber and plastic.

6. The dashpot as defined in claim 2, wherein said floating piston has a body with a stationary stop comprising a ring extending beyond said face.

7. The dashpot as defined in claim 2, wherein said floating piston has a body with an outer surface, and including a low-friction sleeve of a sheet of PTFE over said outer surface of said body.

8. The dashpot as defined in claim 2, wherein said floating piston has a body with an outer surface coated by a material having substantially good friction resistant properties.

9. The dashpot as defined in claim 2, including compression decompression compartments, said pressure compensation chambers communicating hydraulically at at least one end with one of said compression decompression compartments through an auxiliary central bore having a blinded end adjacent to said pressure compensation chamber and communicating with said chamber through a further bore sloping in relation to a bottom edge of said chamber.

10. The dashpot as defined in claim 2, wherein said floating piston has a body comprised of aluminum alloy.

11. The dashpot as defined in claim 2, including a piston rod with a bore connected to said piston, said pressure compensation chamber being located in side bore in said piston rod.

12. The dashpot as defined in claim 2, including a piston rod connected to said piston; a separate housing at an end of said piston rod, said pressure compensation chamber being in said separate housing.

13. The dashpot as defined in claim 12, wherein said housing has a bore, an end of said piston rod or a bolt extending out of said piston rod being in said bore in said housing.

14. A dashpot as defined in claim 13, wherein said bolt comprises a centering pin formed into a bore along its central axis.

15. The dashpot as defined in claim 13, wherein said bore in said housing is sufficiently narrow to provide a tight fit between said bore in said housing and said bolt or said end of said piston rod.

16. The dashpot as defined in claim 13, wherein said end of said piston rod or said bolt extending there out are welded together after insertion into said bore in said housing.

17. The dashpot as defined in claim 16, wherein said welding comprises laser welding.

18. The dashpot as defined in claim 16, wherein said welding extends along the total circumference.

19. The dashpot as defined in claim 18, wherein said welding is carried out in two passes, the first pass being an attaching pass and the second pass being a fastening pass.

20. The dashpot as defined in claim 19, wherein said welding has power that increases or decreases at the beginning or end of the fastening pass.

21. The dashpot as defined in claim 12, wherein said housing and said piston rod are comprised of 19 MnB4 steel.

* * * * *